United States Patent
Husain

(10) Patent No.: US 12,090,672 B2
(45) Date of Patent: Sep. 17, 2024

(54) JOINT TRAINING OF A NARROW FIELD OF VIEW SENSOR WITH A GLOBAL MAP FOR BROADER CONTEXT

(71) Applicant: Google LLC, Mountain View, CA (US)

(72) Inventor: Ammar Husain, Mountain View, CA (US)

(73) Assignee: Google LLC, Mountain View, CA (US)

( * ) Notice: Subject to any disclaimer, the term of this patent is extended or adjusted under 35 U.S.C. 154(b) by 411 days.

(21) Appl. No.: 17/192,517

(22) Filed: Mar. 4, 2021

(65) Prior Publication Data

US 2022/0281113 A1   Sep. 8, 2022

(51) Int. Cl.
*B25J 9/16*   (2006.01)
*G05D 1/00*   (2024.01)

(52) U.S. Cl.
CPC .......... *B25J 9/1697* (2013.01); *G05D 1/0214* (2013.01); *G05D 1/0242* (2013.01)

(58) Field of Classification Search
CPC .... B25J 9/1697; G05D 1/0214; G05D 1/0242
See application file for complete search history.

(56) References Cited

U.S. PATENT DOCUMENTS

| | | | |
|---|---|---|---|
| 7,813,822 B1 | 10/2010 | Hoffberg et al. | |
| 8,793,205 B1 | 6/2014 | Fisher et al. | |
| 9,323,250 B2* | 4/2016 | Wang | B25J 11/009 |
| 9,446,515 B1 | 9/2016 | Meier | |
| 9,630,318 B2 | 4/2017 | Gabardos et al. | |
| 9,717,387 B1 | 8/2017 | Szatmary et al. | |
| 9,821,470 B2 | 11/2017 | Laurent et al. | |
| 10,410,096 B2 | 9/2019 | Dijkman et al. | |
| 10,438,354 B2 | 10/2019 | Hsieh et al. | |
| 2015/0120057 A1 | 4/2015 | Wong et al. | |
| 2018/0339409 A1 | 9/2018 | Williams et al. | |
| 2019/0087975 A1 | 3/2019 | Versace et al. | |
| 2019/0188516 A1* | 6/2019 | Porter | G06V 10/56 |
| 2019/0258251 A1 | 8/2019 | Ditty et al. | |
| 2020/0074266 A1* | 3/2020 | Peake | G06F 18/2411 |
| 2020/0097012 A1 | 3/2020 | Hong et al. | |
| 2020/0117854 A1 | 4/2020 | Lu et al. | |
| 2020/0309541 A1* | 10/2020 | Lavy | G06V 20/588 |
| 2021/0081711 A1* | 3/2021 | Muir | G06T 7/11 |

(Continued)

OTHER PUBLICATIONS

Zhang et al., "Mind your Neighbours: Image Annotation with Metadata Neighbourhood Graph Co-Attention Networks," 2019 IEEE/CVF Conference on Computer Vision and Pattern Recognition (CVPR), 10.1109/CVPR.2019.00307, Jan. 9, 2020, 9 pages.

(Continued)

*Primary Examiner* — Amelia Vorce
(74) *Attorney, Agent, or Firm* — McDonnell Boehnen Hulbert & Berghoff LLP

(57) ABSTRACT

A method includes receiving, from a sensor on a robotic device, a captured image representative of an environment of the robotic device when the robotic device is at a location in the environment. The method also includes determining, based at least on the location of the robotic device, a rendered image representative of the environment of the robotic device. The method further includes determining, by applying at least one pre-trained machine learning model to at least the captured image and the rendered image, a property of one or more portions of the captured image.

18 Claims, 10 Drawing Sheets

```
                                    ┌─ 400
                                    ▼
┌────────────────────────────────────────────────────────┐
│ 402 Receiving, from a sensor on a robotic device, a    │
│ captured image representative of an environment of    │
│ the robotic device when the robotic device is at a    │
│ location in the environment                            │
└────────────────────────────────────────────────────────┘
                          ▼
┌────────────────────────────────────────────────────────┐
│ 404 Determining, based at least on the location of     │
│ the robotic device, a rendered image representative   │
│ of the environment of the robotic device              │
└────────────────────────────────────────────────────────┘
                          ▼
┌────────────────────────────────────────────────────────┐
│ 406 Determining, by applying at least one pre-trained │
│ machine learning model to at least the captured       │
│ image and the rendered image, a property of one or    │
│ more portions of the captured image                   │
└────────────────────────────────────────────────────────┘
```

(56) References Cited

U.S. PATENT DOCUMENTS

2021/0232858 A1* 7/2021 Mukherjee ................ G06T 7/70
2022/0398775 A1* 12/2022 Streem .................... G06T 17/05

OTHER PUBLICATIONS

An et al., "A neural network based retrainable framework for robust object recognition with application to mobile robotics," Appl. Intell., 2011, pp. 190-210, vol. 35.

Chen et al., "Learning Exploration Policies for Navigation," ICLR, arXiv:1903.01959v1, Mar. 5, 2019, 14 pages.

Papadakis, Panagiotis, "Terrain traversability analysis methods for unmanned ground vehicles: A survey," Engineering Applications of Artificial Intelligence 2013, pp. 1372-1385, vol. 26.

Sim et al., "Mobile Robot Localization from Learned Landmarks," Proceedings of the 1998 IEEE/RSJ Intl. Conference on Intelligent Robots and Systems, Oct. 1998, pp. 1060-1065.

\* cited by examiner

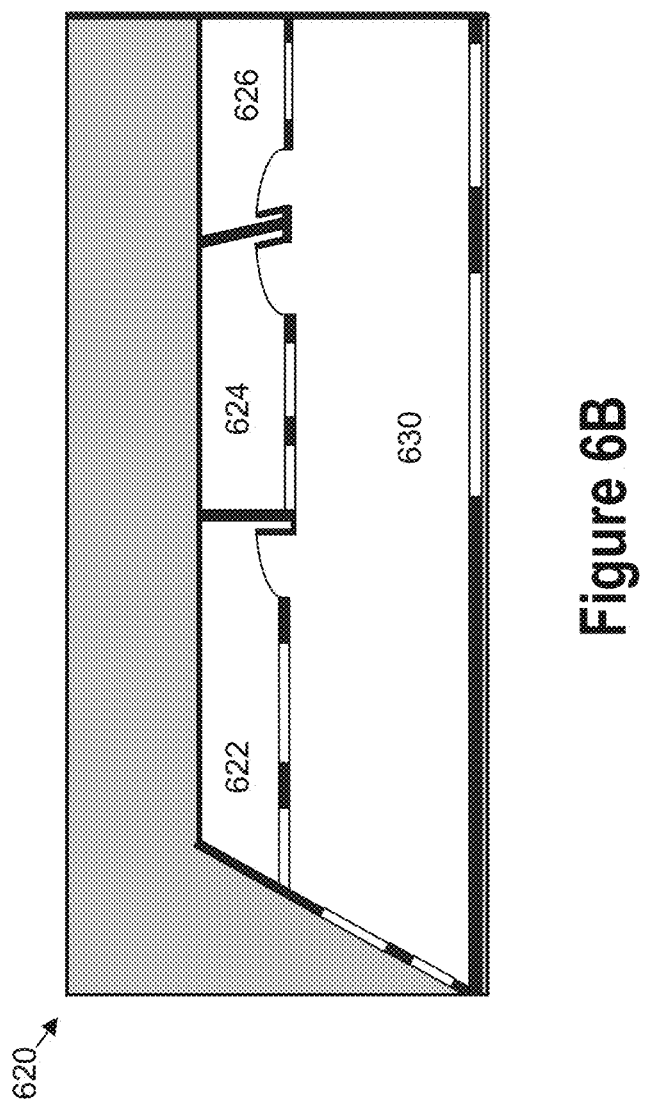

JOINT TRAINING OF A NARROW FIELD OF VIEW SENSOR WITH A GLOBAL MAP FOR BROADER CONTEXT

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve incorporating additional data into robot perception for broader context. A robotic device may be equipped with at least one sensor to determine a captured image. The robotic device may also determine a rendered image. The captured image and the rendered image may be used to determine a property of one or more portions of the captured image.

In an embodiment, a method includes receiving, from a sensor on a robotic device, a captured image representative of an environment of the robotic device when the robotic device is at a location in the environment. The method further includes determining, based at least on the location of the robotic device, a rendered image representative of the environment of the robotic device. The method also includes determining, by applying at least one pre-trained machine learning model to at least the captured image and the rendered image, a property of one or more portions of the captured image.

In another embodiment, a robotic device includes a sensor and a control system. The control system may be configured to receive, from the sensor on the robotic device, a captured image representative of an environment of the robotic device when the robotic device is at a location in the environment. The control system may be further configured to determine, based at least on the location of the robotic device, a rendered image representative of the environment of the robotic device. The control system may also be configured to determine, by applying at least one pre-trained machine learning model to at least the captured image and the rendered image, a property of one or more portions of the captured image.

In a further embodiment, a non-transitory computer readable medium is provided which includes programming instructions executable by at least one processor to cause the at least one processor to perform functions. The functions include receiving, from a sensor on a robotic device, a captured image representative of an environment of the robotic device when the robotic device is at a location in the environment. The functions further include determining, based at least on the location of the robotic device, a rendered image representative of the environment of the robotic device. The functions also include determining, by applying at least one pre-trained machine learning model to at least the captured image and the rendered image, a property of one or more portions of the captured image.

In another embodiment, a system is provided that includes means for receiving, from a sensor on a robotic device, a captured image representative of an environment of the robotic device when the robotic device is at a location in the environment. The system further includes means for determining, based at least on the location of the robotic device, a rendered image representative of the environment of the robotic device. The system also includes means for determining, by applying at least one pre-trained machine learning model to at least the captured image and the rendered image, a property of one or more portions of the captured image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 6B depicts a rendered image, in accordance with example embodiments.

DETAILED DESCRIPTION

Figure 1:
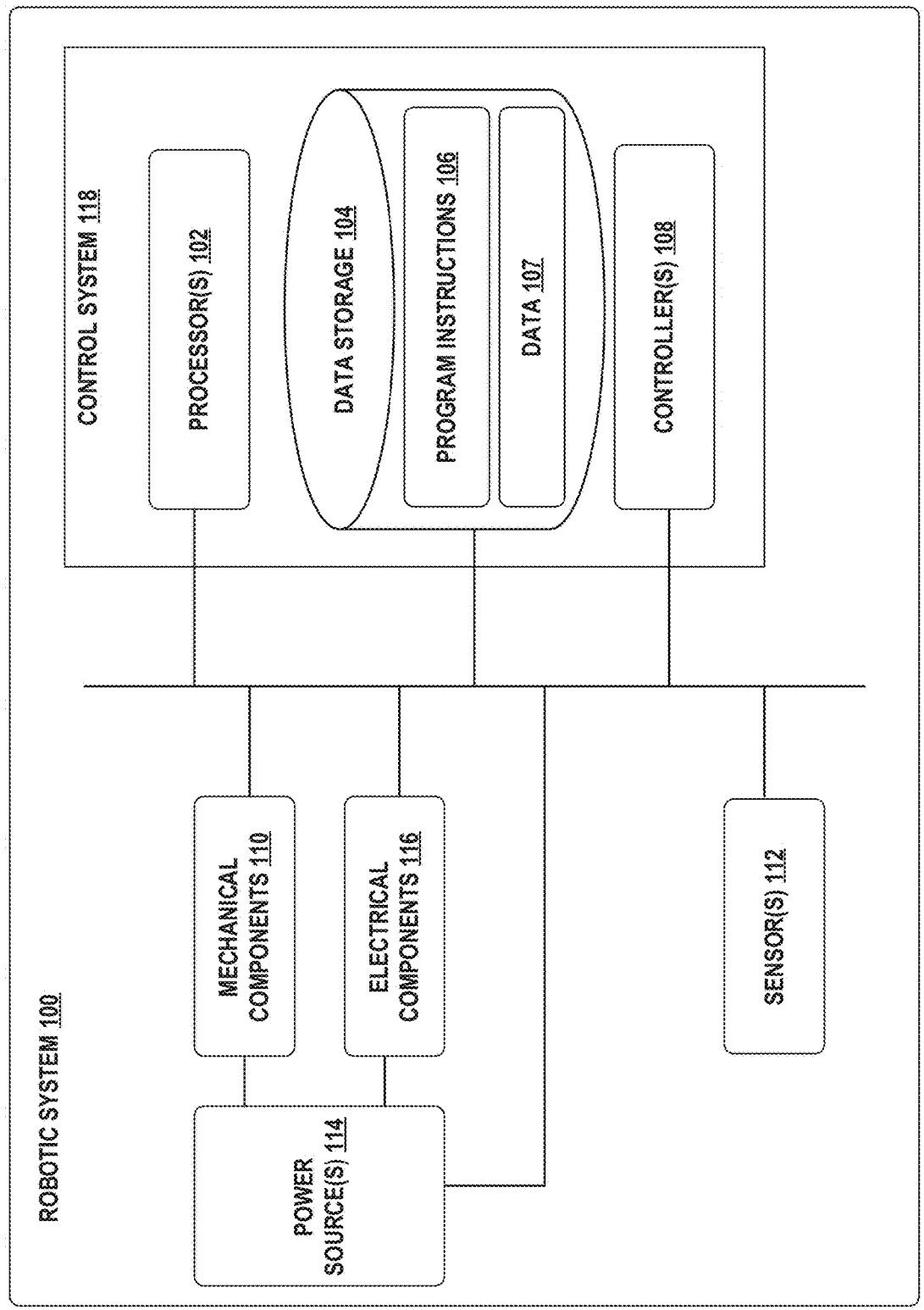
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

In recent years, robotic devices have been adopted to automate routine activities for a variety of applications from manufacturing to house cleaning to food delivery. These applications often involve a robotic device moving autonomously in an environment, navigating around obstacles and determining the difference between drivable and non-drivable surfaces. Some applications may further involve the robotic device determining one or more properties of objects in the environment to perform the task at hand. To facilitate navigation and other tasks, many robotic devices may have imaging sensors, e.g., red green blue (RGB) sensors, to sense objects in the surrounding environment and to determine their relevance to the task at hand.

However, robotic devices may nevertheless have difficulty differentiating between objects, surfaces, and other properties necessary for navigation and/or function, particularly when the objects easily blend into the background. For example, a robotic device may be operating within an office environment with transparent glass panels separating one room from another room. The robotic device may be operating in this environment for an extended amount of time and the robotic device may be tasked with performing various tasks within this environment. For example, the robotic device could be tasked with clearing tables in a room surrounded by transparent glass panels. However, because an image of the room from the inside could be similar to an image of the room looking in through the transparent glass panel, it may be difficult for the robotic device to determine whether the path in front of it is drivable or not. Further, it may be difficult for the robotic device to determine whether it is actually inside the room or standing just outside the room. In some examples, the robotic device may determine that the image demonstrates that it is inside the room and take actions based on this. Consequently, the robotic device may crash into the glass panel, which may cause costly damage to the office building and/or the robotic device.

Provided herein are methods for providing broader context so that a robotic device may more accurately determine a property of one or more portions of a captured image. In some examples, a robotic device may be familiar with the environment where it is located and may have stored in memory a map of the environment. The robotic device may further have an RGB sensor responsible for observing objects or the environment at large. From the map, the robotic device may determine a rendered image of the environment and with the sensor, the robotic device may capture an image of the surrounding environment. The robotic device may then apply a pre-trained machine learning model to the captured image and the rendered image to determine a property of one or more portions of the image. Many variations on this method are possible, several of which will be described further in the following sections.

For a robotic device located in a building, warehouse, or other environment, the robotic device may first establish a map of the environment. In many cases, the robotic device may be unfamiliar with the layout of the environment. The robotic device may thus first establish a map of this environment through driving and navigating around the environment in line with established or proprietary methods. Alternatively, if the environment is similar to one with which the robotic device is already familiar, for example a building with the same or similar floor plan, then the robotic device may use a previously established map of the same environment. Still alternatively, if the robotic device has navigated in the environment previously, the robotic device may obtain a map from memory.

Using sensors on the robotic device (e.g., a GPS or mobile signal or perhaps a captured image), the robotic device may determine an approximate location at which it is located. This location may be relative to a location on the map. Based on the map and perhaps based on the location of the robotic device in the map, the robotic device may then determine a rendered image representative of the environment in which it is located. This rendered image could take a few forms, including but not limited to a top-down view of the environment or a perspective view of the environment. For example, a top-down image of an environment may be similar to a blueprint of the building and could be cropped based on the location of the robotic device. The perspective image may be an angled view of the environment, for example an angled view of a blueprint of the building, and could also be cropped based on the location of the robotic device and possibly an orientation of an image sensor on the robotic device as well. Alternatively, the perspective image may be a rendered graphical representation of what the robotic device assumes the environment resembles based on previously collected data. The rendered images may be updated as the robotic device moves within the environment.

To navigate around the environment and perform tasks, the robotic device may capture an image of the environment with a sensor on the device, e.g., a RGB camera, a RGB depth camera, a depth sensor, or a LIDAR sensor. Additionally or alternatively, the robotic device may capture images from multiple sensors to obtain more accurate depth information, for example, by arranging the sensors in stereo pairs. These images may be used to provide context of where the robotic device is located and of the objects in its surroundings (e.g., desks, walls, etc.).

Equipped with a rendered image based on the map of the environment and the captured image of the environment, the robotic device may then apply a pre-trained machine learning model to determine a property of one or more regions in the captured image. The captured image and the rendered image may be concatenated for input into the pre-trained machine learning model. Because the rendered image may have a wider field of view than the captured image, the rendered image may provide context in identifying the property of one or more regions in the captured image. As mentioned previously, an example property of the one or more regions in the captured image could be drivability of a region in the image.

In some cases, the pre-trained machine learning model may be specifically trained on captured and rendered images of the environment in which the robotic device is located. However, if the robotic device is deployed in multiple locations with several different floor plans, it may be difficult and inefficient to train a different model for each location. In such situations, a machine learning model previously trained to classify properties of one or more portions of images of a certain location/map may be fine-tuned based on the present location/map of the robotic device. Specifically, the parameters of the pre-trained machine learning model may be refined through training with a smaller data set that incorporates captured images and rendered images of its present location. Fine-tuning may offer advantages of better accuracy while necessitating less data for training, thereby making the process potentially more efficient.

In some examples, the pre-trained machine learning model may take the location of the robotic device as an additional input. This location of the robotic device could be coordinates in the map or coordinates in the rendered image, among other possibilities. With this location information, the pre-trained machine learning model may be able to better determine the property of the one or more pictured regions.

In a further embodiment, various locations pictured in the rendered image may be labeled and serve as another input into the pre-trained machine learning model to add further context. For example, the labels may correspond to coordinates on the rendered image and/or the map. The labels and the corresponding coordinates may be concatenated to the rendered image and the captured image as inputs into the pre-trained machine learning model. Alternatively, the labels may be a separate input or separate inputs into the pre-trained machine learning model. Other architectures for inputting this information into the pre-trained machine learning model may be possible.

Following the determination of the property of the one or more regions in the captured image, the robotic device may be controlled accordingly. For example, if the property to be determined is drivability and the pre-trained machine learning model predicts that the pictured portion of the image is not drivable, then the robotic device may be controlled to face a different direction and classify if the new area is drivable or not. If the pre-trained machine learning model determines that this area is drivable, then the robotic device may be controlled to drive forward towards its target location.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
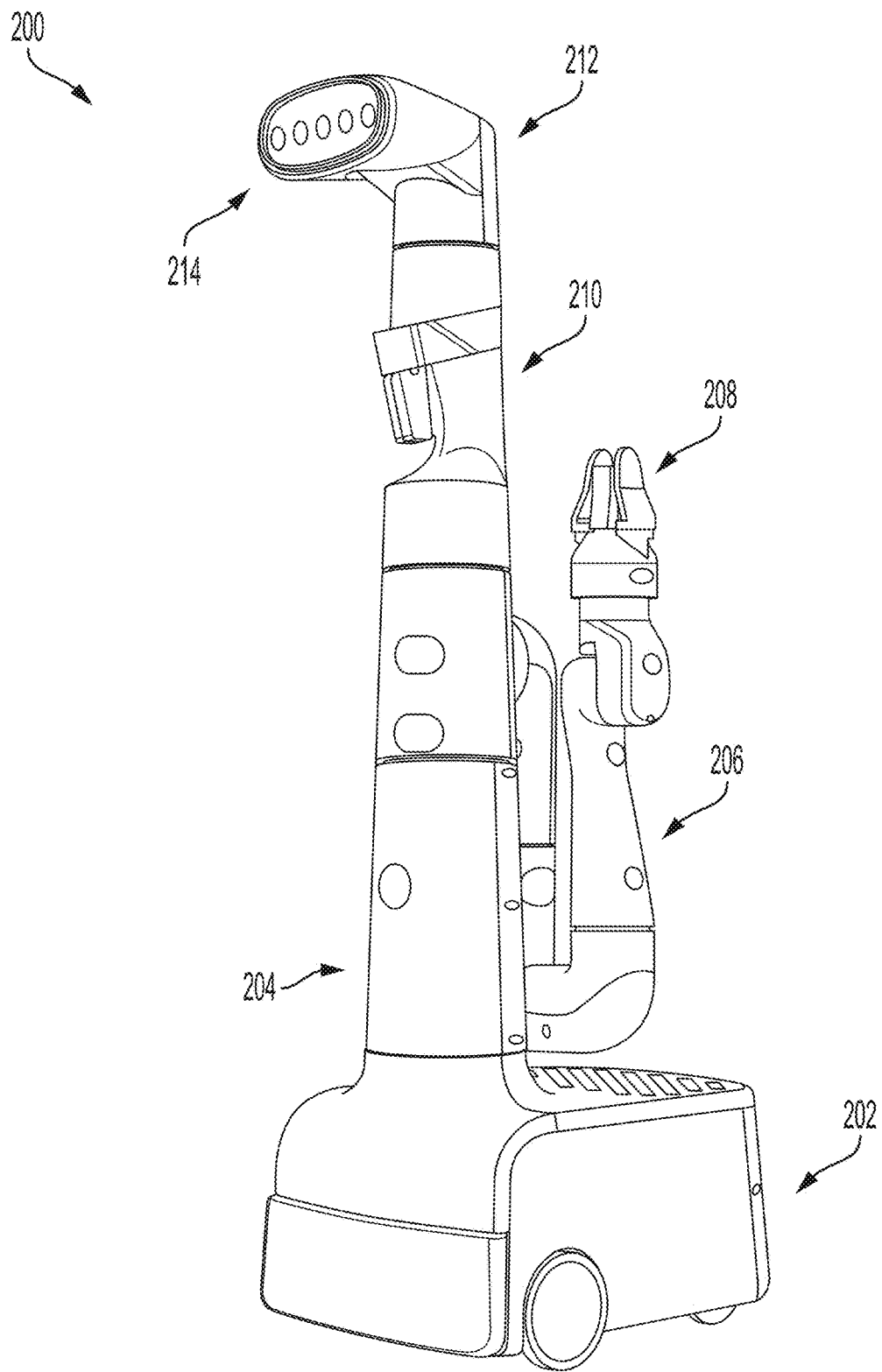
FIG. 2 illustrates a mobile robot, in accordance with example embodiments.
Figure 3:
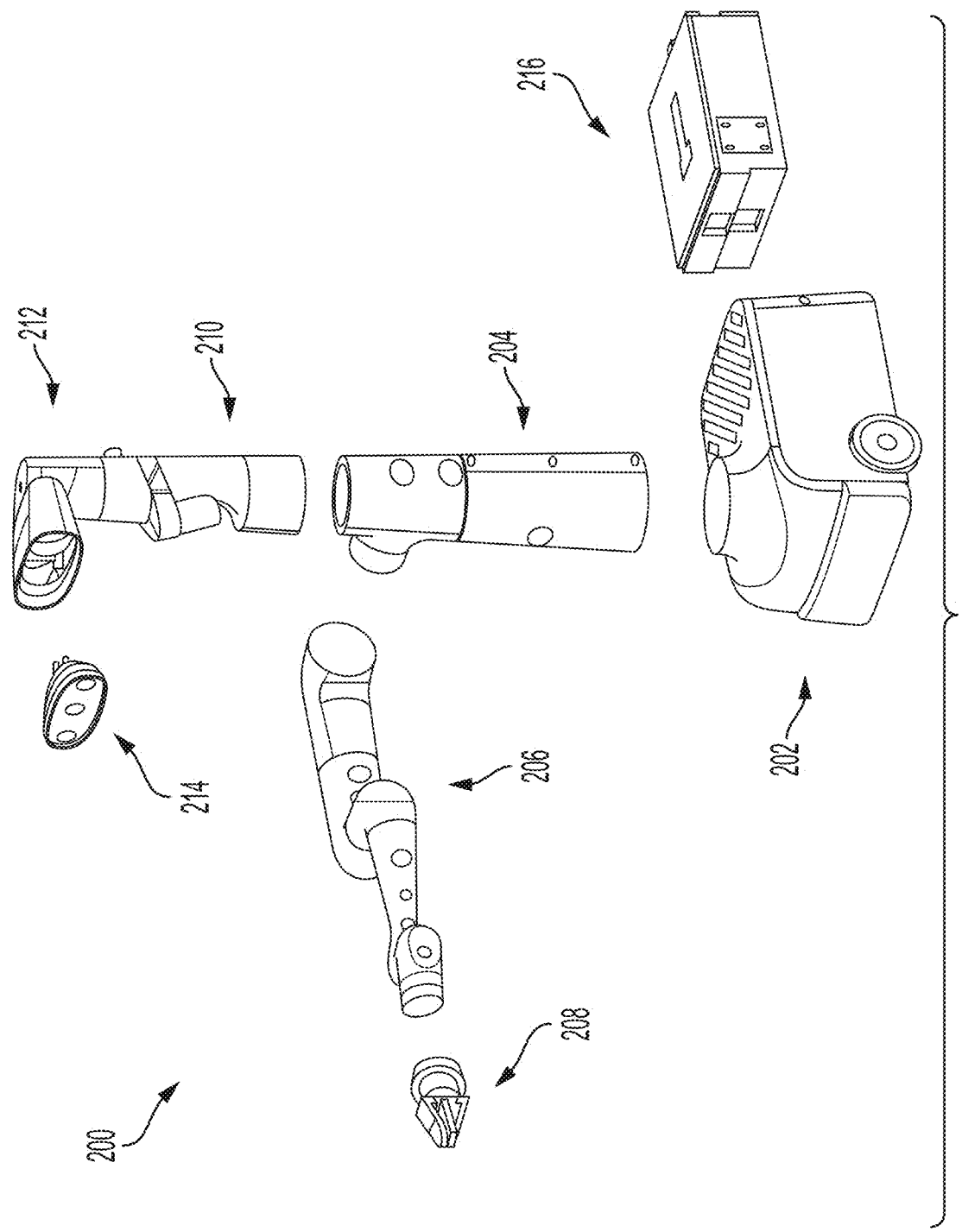
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
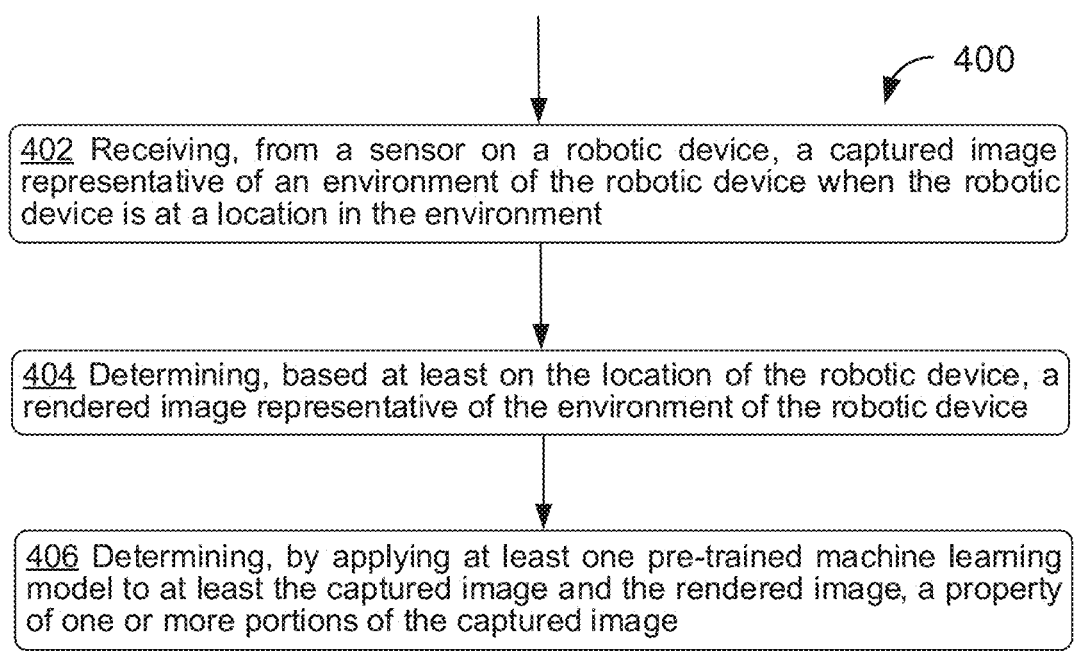
FIG. 4 is a block diagram of a method, in accordance with example embodiments.

FIG. 4 is a block diagram of method 400, in accordance with example embodiments. Blocks 402, 404, and 406 may collectively be referred to as method 400. In some examples, method 400 of FIG. 4 may be carried out by a control system, such as control system 118 of robotic system 100. In further examples, method 400 of FIG. 4 may be carried out by a computing device or a server device remote from the robotic device. In still further examples, method 400 may be carried out by one or more processors, such as processor(s) 102, executing program instructions, such as program instructions 106, stored in a data storage, such as data storage 104. Execution of method 400 may involve a robotic device, such as the robotic device illustrated and described with respect to FIGS. 1-3. Further, execution of method 400 may involve a computing device or a server device remote from the robotic device and robotic system 100. Other robotic devices may also be used in the performance of method 400. In further examples, some or all of the blocks of method 400 may be performed by a control system remote from the robotic device. In yet further examples, different blocks of method 400 may be performed by different control systems, located on and/or remote from a robotic device.

Those skilled in the art will understand that the block diagram of FIG. 4 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Figure 5A:
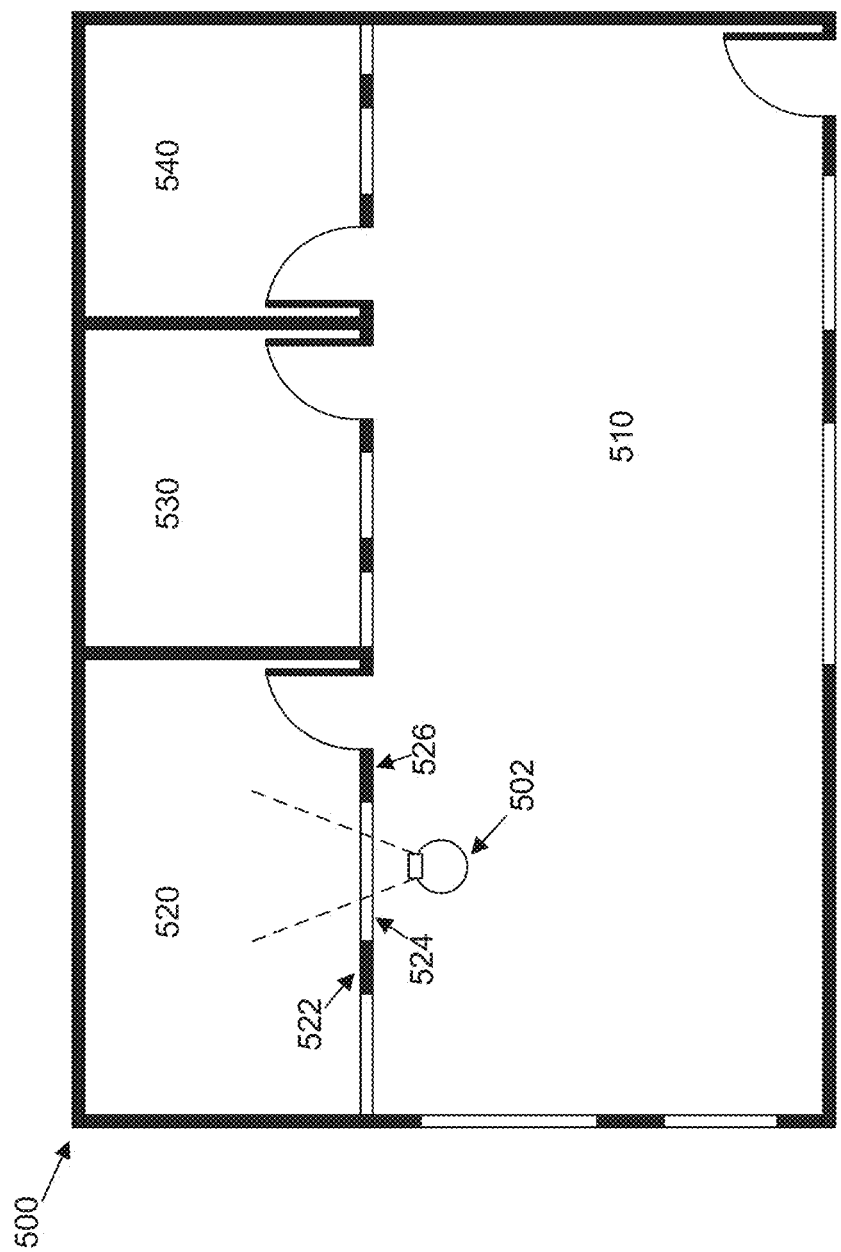
FIG. 5A depicts an environment, in accordance with example embodiments.

FIG. 5A depicts an environment, in accordance with example embodiments. More specifically, robotic device 502 is shown operating in environment 500. Environment 500 contains rooms 510, 520, 530, and 540. Surrounding room 520 are windows (e.g., window 524) and walls (e.g., wall 522 and wall 526). Robotic device 502 is standing in room 510, looking into room 520 through window 524.

Robotic device 502 may be tasked to perform various functions in environment 500. For example, if environment 500 is an office environment, robotic device 502 may be tasked with picking up trash, clearing tables, sanitizing commonly touched surfaces, and other tasks. To perform these tasks, robotic device 502 may identify properties of one or more areas in the environment. To identify these properties, the robotic device may carry out operations outlined in method 400, particularly when robotic device 502 has operated or will be operating in environment 500 for an extended amount of time. Robotic device 502 may thus be familiar with environment 500.

Referring back to FIG. 4, at block 402, method 400 includes receiving, from a sensor on a robotic device, a captured image representative of an environment of the robotic device when the robotic device is at a location in the environment. As an example, robot 200 may carry out this step and/or this method. Robot 200 may capture an image representative of the environment using a sensor in perception suite 214 or EOAS 208. In further examples, the sensor may be a red green blue (RGB) camera.

Figure 5B:
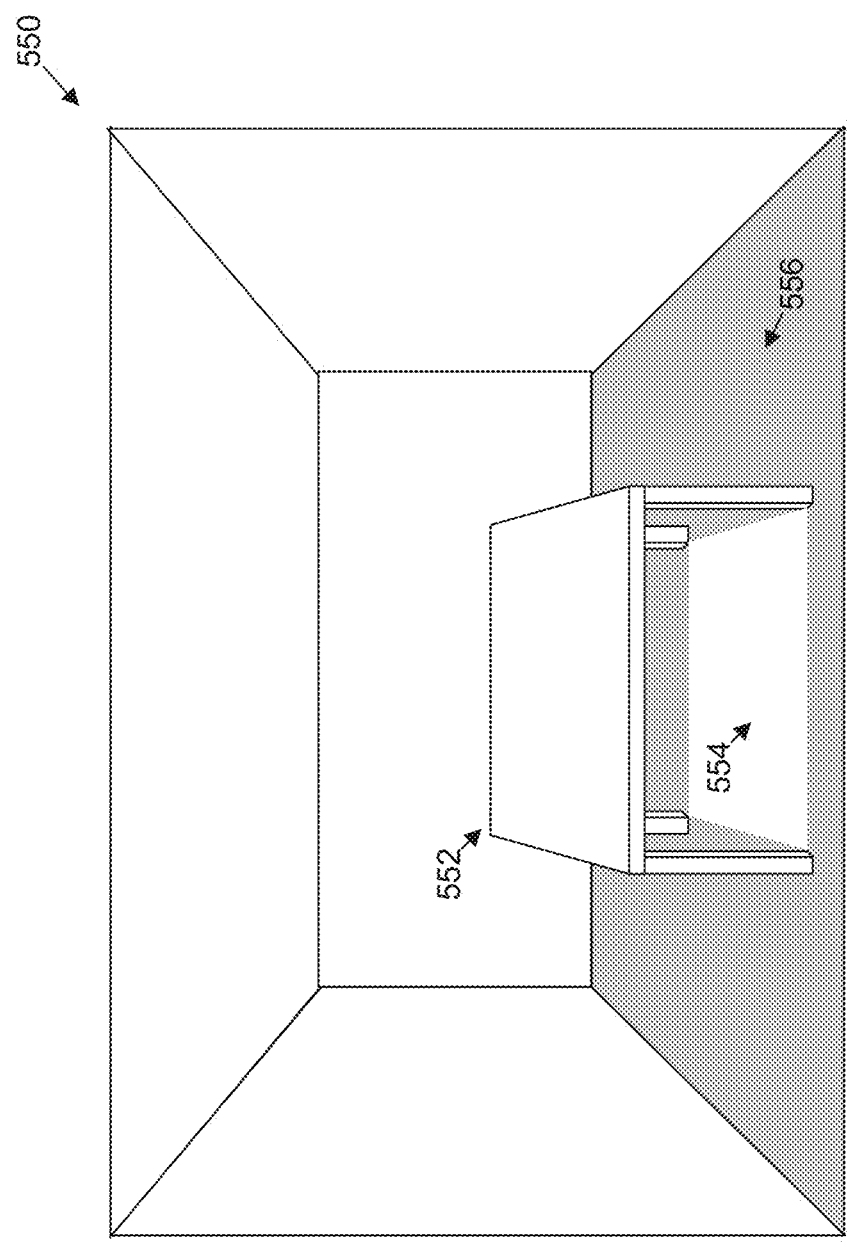
FIG. 5B depicts an image, in accordance with example embodiments.

FIG. 5B depicts captured image 550, in accordance with example embodiments. Captured image 550 includes table 552 and the floor, as indicated by areas 554 and 556. Captured image 550 may be captured by robotic device 502 operating in environment 500 and looking into room 520, as depicted by FIG. 5A. Because window 524 may be transparent, captured image 550 may be similar to an image taken within room 520.

In some examples, robotic device 502 may have been tasked with clearing the table in room 520. Robotic device 502 may use captured image 550 to determine which areas of the image are drivable and non-drivable. Robotic device 502 may analyze captured image 550 using a conventional algorithm (e.g., a machine learning model trained to output the drivability or other properties of an area). Because window 524 may be transparent and virtually indistinguishable in captured image 550, the conventional algorithm may determine that area 554 of captured image 550 is not drivable and area 556 of captured image 550 is drivable. Robotic device 502 may follow these instructions and consequently crash into window 524. Consequently, for the above reasons and perhaps others, algorithms used for processing information for robotic device 502 may benefit from broader context.

Referring back to FIG. 4, at block 404, method 400 includes determining, based on the location of the robotic device, a rendered image representative of the environment of the robotic device. As used herein, the rendered image refers to an image generated from an existing representation of the environment. In some examples, the rendered image representative of the environment may be obtained using a map stored on the robotic device or in a remote server. Block 404 may be carried out on the robotic device or on the remote server. Many types of rendered images may be possible, such as top-down rendered images and perspective rendered images. Additionally, variations of these rendered images are also possible.

Figure 6A:
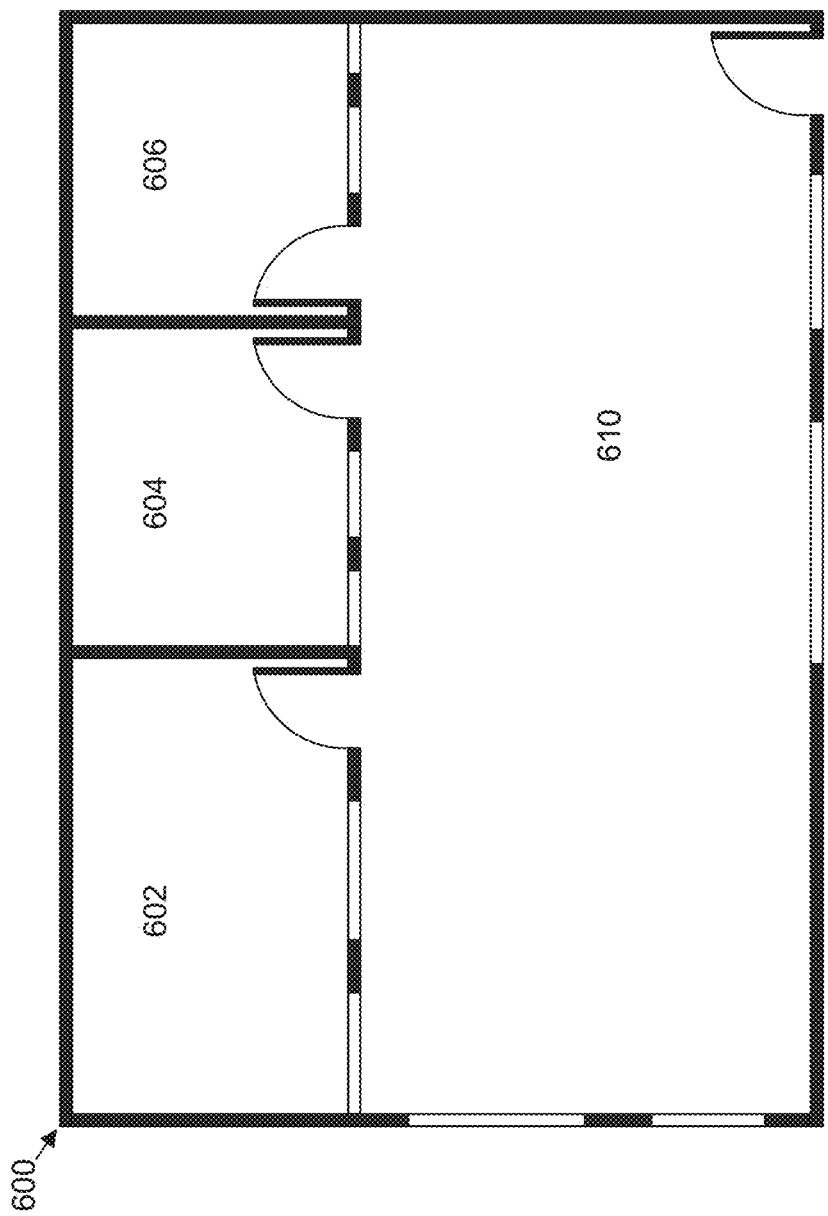
FIG. 6A depicts a top-down image, in accordance with example embodiments.

FIG. 6A depicts top-down rendered image 600, in accordance with example embodiments. Top-down rendered image includes regions 602, 604, 606, and 610. Region 602 may be representative of room 520, region 604 may be representative of room 530, region 606 may be representative of room 540, and region 610 may be representative of room 510.

Top-down rendered image 600 may depict environment 500 in its entirety by including depictions of rooms 510, 520, 530, and 540. In practice, however, a top-down rendered image representative of the environment may be representative of the environment in part. For example, a top-down rendered image may only contain depictions of rooms 520, 530, and part of room 510. Top-down rendered image 600 may be derived from a map of the environment. Generating top-down image 600 from the map may include processing mechanisms including transforming the map, cropping a rendered image, and others.

FIG. 6B depicts perspective rendered image 620, in accordance with example embodiments. Perspective rendered image 620 includes areas 622, 624, 626, 630, which are representative of rooms 520, 530, 540, and 510, respectively. Perspective rendered image 620 depicts environment 500 in part, although in practice, a perspective rendered image may depict the environment in part or in whole. As discussed later, perspective rendered image 620 may be generated by processing a map of the environment by transforming views and cropping image elements.

Top-down rendered image 600 and perspective rendered image 620 may be two examples of rendered images, but many others are possible. For example, rendered images may resemble captured images. In general, the rendered images may provide additional information and a broader context for captured image 550. Specifically, the rendered images may depict a different view of the area in which the robot is present, thereby providing additional information and a broader context. Further, the rendered images may have a broader field of view than the captured image, which may also provide further information. The rendered images may also contain semantic labels. These semantic labels may be annotations that were generated through analyzing the map using a human-assisted process or a machine-assisted process (e.g., using a machine learning model or other model). These semantic labels may have been generated in the past and stored on a remote server and/or on the robotic device. Semantic labels stored on the remote server may be retrieved and stored on the robotic device, perhaps with a map of the environment.

To generate top-down rendered image 600 and perspective rendered image 620, robotic device 502 may use a map. In some examples, robotic device 502 may have stored in memory a map that can form the basis of these images. Alternatively or additionally, robotic device 502 may also query a remote server for the map. For example, other robotic devices may have operated in environment 500 and generated a map of the environment, which was then sent to a remote server. However, robotic device 502 may be new to the environment. Robotic device 502 may query the remote server, perhaps with an identifier of the environment, to obtain the previously generated map of the area. Still alternatively or additionally, robotic device 502 may obtain from memory or from a remote device a map of a similar environment in which it is operating. For example, the map may be of another floor in a same building that has the same or similar layout to the environment that the robotic device 502 is operating. Still alternatively, a robotic device 502 not in possession of the map (or, perhaps to refine a previously stored map of the environment) may drive around the environment to obtain a map of the environment (or to refine a previously stored map of the environment).

In some examples, robotic device 502 may locate itself in the environment prior to generating the rendered image. Since the rendered image may depict the environment in which robotic device 502 is located (e.g., environment 500), it may be useful to first locate the robotic device, then to generate a rendered image. The method may incorporate locating robotic device 502 in the environment prior to generating the rendered image in cases where, for instance, robotic device 502 generates a rendered image representative of the environment in part. In these situations, robotic device 502 may locate itself to determine which part of the environment for which to generate a rendered image. For example, for a top-down rendered image, the location may be used to determine a portion of the map near this location (for instance, a portion with a predetermined area surrounding the robot's location). The map portion may then be used to generate the top-down rendered image. In further examples, the location (and perhaps field of view information of the sensor used to capture the captured image) may similarly be used to determine a pictured area for a perspective rendered image. The location may also be used for other purposes, as described herein.

In further examples, determining the direction that the robotic device faces or that a sensor on the robotic device faces may also facilitate generating the rendered image. For example, the direction and the location of the robotic device may be used in combination to generate the perspective image. Specifically, the location may be used to determine the area of the map to use to generate the perspective image, and the direction may be used to determine perspective of the perspective image.

Referring back to FIG. 4, at block 406, method 400 includes determining, by applying at least one pre-trained machine learning model to at least the captured image and the rendered image, a property of one or more portions of the captured image. Block 406 may be carried out by the robotic device or a remote server device.

Figure 7:
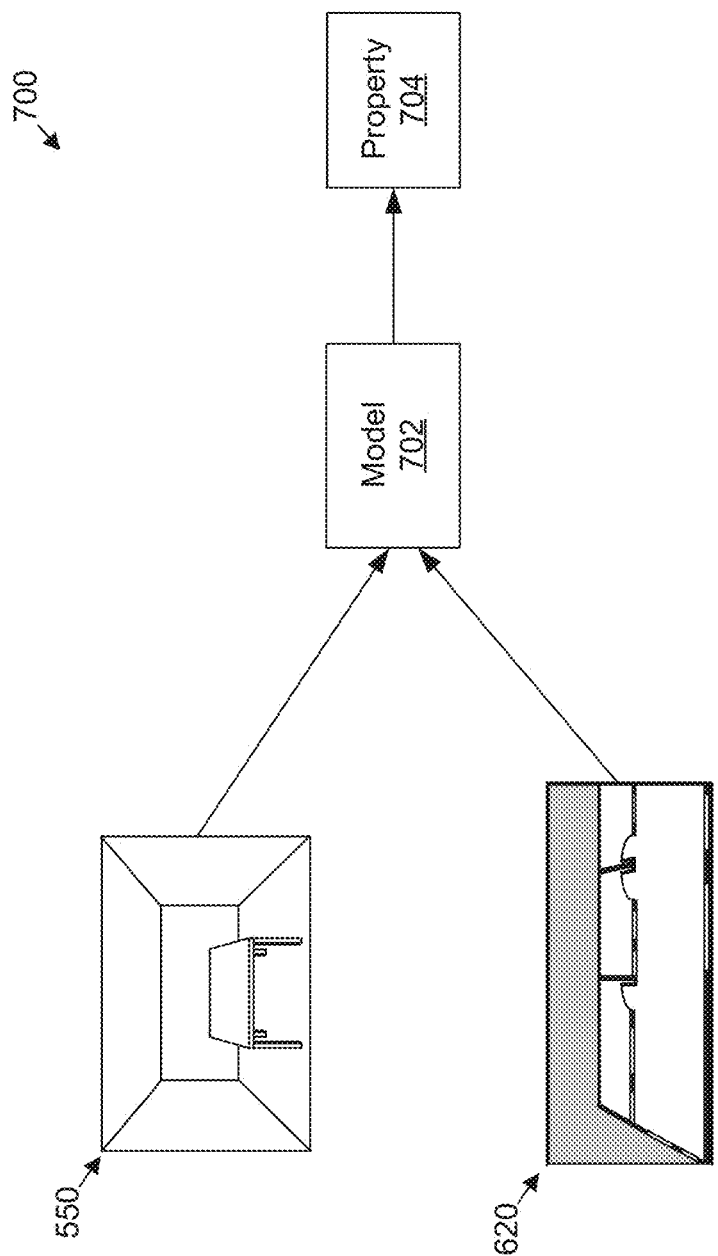
FIG. 7 is a block diagram, in accordance with example embodiments.

FIG. 7 depicts example pipeline 700, in accordance with example embodiments. Pipeline 700 includes captured image 550 and perspective rendered image 620 as inputs into model 702. Upon input of captured image 550 and perspective rendered image 620, model 702 may generate a property of one or more portions of the captured image. As mentioned above, various other rendered images may be used as input into model 702 in lieu of perspective rendered image 620.

Although pipeline 700 portrays only two inputs into model 702, additional data may also be input into model 702. In some examples, labels of each room and/or element of the rendered image may also serve as an input into model 702. For example, the labels may indicate that room 520 of environment 500 is an office space or that curved lines indicate doorways. The rendered image may be labeled in whole, labeled in part, or not labeled at all. In further examples, the location and/or the direction that the robotic device is facing may also be inputs into model 702. In still further examples, additional images may also be input into model 702. In practice, the additional labels, locations, and directions may be reformatted as numbers (e.g., an ID may be assigned with each type of room, a location may be associated with coordinates on a rendered image, and so forth) before being input into model 702.

Model 702 may be a machine learning model that was trained on a dataset including at least the inputs to the model. The machine learning model may incorporate at least one supervised machine learning model (e.g., a neural network) to output property 704. In some cases, the machine learning model may also incorporate unsupervised machine learning methods to output property 704. The inputs of the machine learning model (e.g., captured image 550, perspective rendered image 620) may be concatenated prior to input into the machine learning model. Other inputs (e.g., location of the robotic device and area labels) may be separate inputs into the machine learning model or concatenated with the image inputs. In some cases, the other inputs may be incorporated into the captured image and/or the rendered image. For instance, the rendered image may contain edited pixels to indicate where the robotic device is. Further, the rendered may be labeled with the names of the rooms.

In some examples, model 700 could apply an attention mechanism between the captured image and the rendered image. The attention mechanism in the neural network may be explicitly trained. For example, the attention mechanism could be given, as an input, a captured image and be trained to identify a region of a rendered image to which the captured image attends. Given a region in the rendered image to which the captured image attends, the trained neural network may determine the predicted property. In practice, when given a certain captured image and rendered image, the trained attention mechanism may emphasize certain regions of a rendered image that correspond to the captured image.

In some examples, model 702 may be trained on data sets that are representative of the environment in which the robotic device is located (e.g., the same building or a building with a similar floor plan). Alternatively, model 702 may be trained on data sets that are not representative of the area in which the robotic device is located. If model 702 is trained on data sets that are not representative of the area in which the robotic device is located, model 702 may be fine-tuned using another, perhaps smaller, data set that is representative of the area in which the robotic device is currently located.

Further, data sets used to train model 702 may include at least captured images, rendered images, and labels corresponding to a property of one or more portions of the captured image. The labels may be generated with the assistance of a human operator. The training data set may contain all the properties that the machine learning model predicts. For example, if the intent of the machine learning model is to determine drivability of one or more portions of a captured image, the training data set may at least contain captured images, rendered images, and labels pertaining to determining drivability.

Although labels are indicated herein as properties (e.g., drivability), in practice, labels may be numbers that may be used to refer to properties. For example, if a model is indicating whether an area is drivable or not drivable, drivable may be indicated by a zero and non-drivable may be indicated by a one. In further examples, if the model is indicating whether an area is easily drivable, moderately drivable, or difficult to drive, the labels may be zero, one, or two, respectively.

Property 704 output by model 702 may indicate a number of properties, and robotic device 502 may be controlled to operate according to the determined properties. For example, model 702 may output drivability as an output. Other example determined properties could include task related properties (e.g., whether a surface is moveable or not, whether a surface is dirty and/or needs cleaning, etc.) and/or navigation related properties (e.g., whether a surface that the robotic device is intending to drive on is solid, liquid, etc.). Taking captured image 550 as an example, model 702 may indicate that neither area 554 nor area 556 are drivable. Based on this determination, robotic device 502 may be controlled to drive in a different direction rather than the direction that it is facing.

Figure 8:
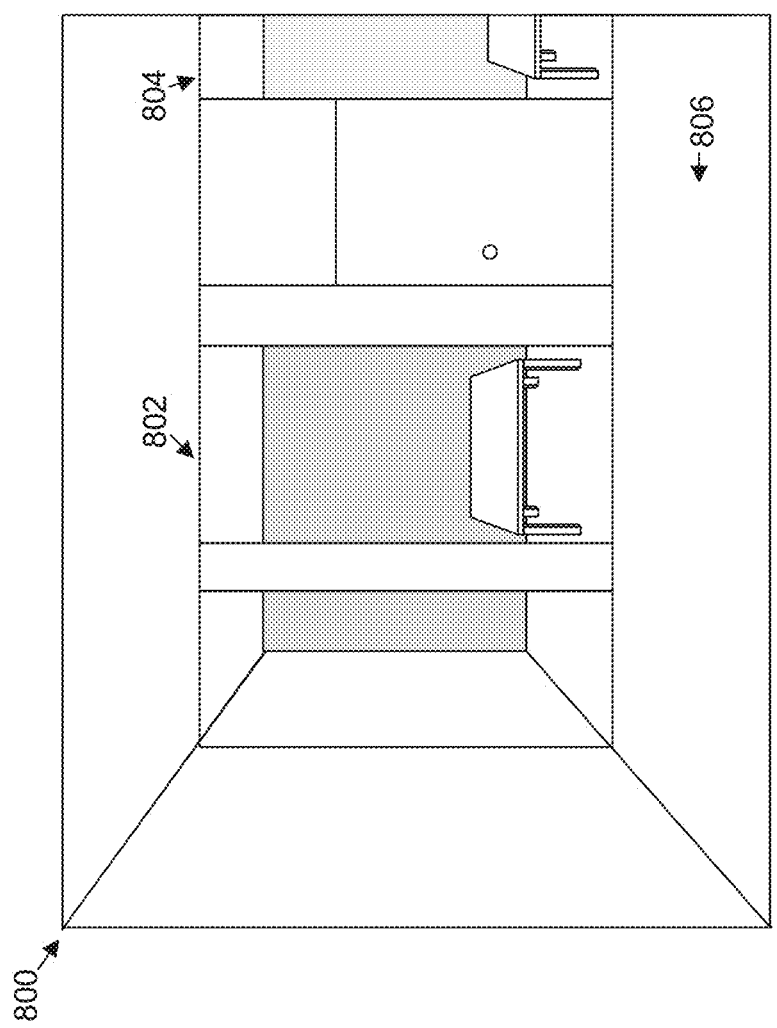
FIG. 8 depicts a perspective image, in accordance with example embodiments.

In some examples, pipeline 700 may incorporate a broader field of view image in lieu of generating a rendered image (e.g., top-down rendered image 600 or perspective rendered image 620). For example, FIG. 8 depicts perspective image 800, in accordance with example embodiments. Perspective image 800 is a wider field of view image than captured image 550 and depicts the field of view of robot 502 in environment 500. Perspective image 800 includes area 802, area 804, and area 806. Area 802 may be representative of room 520, area 804 may be representative of room 530, and area 806 may be representative of room 510. It may be observed that perspective image 800 depicts different areas as captured image 550, as neither area 804 nor area 806 are pictured in captured image 550.

Due to the broader field of view, perspective image 800 may provide context to the rendered images. In some cases, perspective image 800 may be obtained from a sensor on robotic device 502 that has a broader field of view than the sensor from which the captured image is obtained. Alternatively or additionally, perspective image 800 may be obtained from one or more sensors on the robotic device that, when combined, have a wider field of view (either horizontally, vertically, or both) than the sensor from which the captured image was obtained. Further, this sensor may be a same or different type of sensor than the sensor from which the captured image is obtained.

As mentioned above, the blocks of method 400 may be carried out on a robotic device or on a remote device. For example, robotic device 502 may generate the captured image and the rendered image and a property of one or more portions of the captured image may be determined on a computing system of robotic device 502. Alternatively, robotic device 502 may send the captured image and the rendered image to a server device so that the server device may apply a pre-trained machine learning model to determine the property of one or more portions of the captured image. Still alternatively, the server device may determine the rendered image and send the rendered image to robotic device 502 for determining the property of one or more portions of the captured image. Alternatively, the server device may receive the captured image from robotic device 502, but the server device may generate the rendered image. The server device may then determine the property of one or more portions of the captured image based on the rendered image and the received captured image. If the property of the one or more portions of the captured image is determined on the remote device, the remote device may send the property to robotic device 502.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, from a sensor on a robotic device, a captured image representative of an environment of the robotic device when the robotic device is at a location in the environment;
   determining, based at least on the location of the robotic device, a rendered image representative of the environment of the robotic device;
   determining, by applying at least one pre-trained machine learning model to at least the captured image and the rendered image, predicted drivability of one or more portions of the environment represented by the captured image and the rendered image, wherein the pre-trained machine learning model has been trained based on a dataset comprising pairs of captured images and associated rendered images and labels associated with drivability of one or more portions of a depicted environment of the associated captured image and the associated rendered image, wherein each such pair represents a respective environment; and
   controlling, based on the predicted drivability of the one or more portions of the environment, the robotic device to navigate in the environment.

2. The method of claim 1, wherein the rendered image is a top-down image of an area at the location of the robotic device.

3. The method of claim 1, wherein the rendered image is a perspective image of an area at the location of the robotic device.

4. The method of claim 1, wherein the rendered image has a wider field of view than the captured image.

5. The method of claim 1, wherein the method further comprises:
   receiving, by the robotic device from a remote device, a map of the environment, wherein the rendered image is further based on the map.

6. The method of claim 1, wherein the method further comprises:
   determining, by the robotic device, a map of an area at the location of the robotic device, wherein determining the rendered image is further based on the determined map.

7. The method of claim 6, wherein the map includes one or more labels corresponding to the area at the location of the robotic device, and wherein the at least one pre-trained machine learning model is further applied to the one or more labels.

8. The method of claim 1, wherein the method further comprises:
   determining a point in the rendered image, wherein the point is representative of where the robotic device is located, wherein the at least one pre-trained machine learning model is further applied to the determined point.

9. The method of claim 1, wherein the captured image and the rendered image are concatenated prior to being input into the at least one pre-trained machine learning model.

10. The method of claim 1, wherein determining the property of the one or more portions of the environment represented by the captured image comprises:
   transmitting, to a remote device, the captured image and the rendered image; and
   receiving, from the remote device applying the at least one pre-trained machine learning model to the captured image and the rendered image, the property of the one or more portions of the environment represented by the captured image.

11. The method of claim 1, wherein the at least one pre-trained machine learning model comprises an attention mechanism trained to identify a region of the rendered image such that the captured image attends to the region of the rendered image for determining the property of the one or more portions of the environment represented by the captured image.

12. The method of claim 1, wherein one of the at least one pre-trained machine learning model is a model trained on a different environment of the robotic device and further refined based on the environment of the robotic device.

13. The method of claim 1, wherein the method further comprises:
   prior to determining the rendered image, determining the location of the robotic device in the environment.

14. A robotic device comprising:
   a sensor; and
   a control system configured to:
      receive, from a sensor on a robotic device, a captured image representative of an environment of the robotic device when the robotic device is at a location in the environment;
      determine, based at least on the location of the robotic device, a rendered image representative of the environment of the robotic device;
      determine, by applying at least one pre-trained machine learning model to at least the captured image and the rendered image, predicted drivability of one or more portions of the environment represented by the captured image and the rendered image, wherein the pre-trained machine learning model has been trained based on a dataset comprising pairs of captured images and associated rendered images and labels associated with drivability of one or more portions of a depicted environment of the associated captured image and the associated rendered image, wherein each such pair represents a respective environment; and
      control, based on the predicted drivability of the one or more portions of the environment, the robotic device to navigate in the environment.

15. The robotic device of claim 14, wherein the sensor is a red green blue (RGB) camera, a red green blue depth (RGB-D) camera, a depth sensor, or a LIDAR sensor.

16. The robotic device of claim 14, wherein the control system is further configured to:
   determine a map of an area at the location of the robotic device, wherein the control system is configured to determine the rendered image based on the determined map.

17. The robotic device of claim 14, wherein the control system is further configured to:
   prior to determining the rendered image, determine the location of the robotic device in the environment.

18. A non-transitory computer readable medium comprising program instructions executable by at least one processor to cause the at least one processor to perform functions comprising:
   receiving, from a sensor on a robotic device, a captured image representative of an environment of the robotic device when the robotic device is at a location in the environment;
   determining, based at least on the location of the robotic device, a rendered image representative of the environment of the robotic device;
   determining, by applying at least one pre-trained machine learning model to at least the captured image and the rendered image, predicted drivability of one or more portions of the environment represented by the captured image and the rendered image, wherein the pre-trained machine learning model has been trained based on a dataset comprising pairs of captured images and associated rendered images and labels associated with drivability of one or more portions of a depicted environment of the associated captured image and the associated rendered image, wherein each such pair represents a respective environment; and
   controlling, based on the predicted drivability of the one or more portions of the environment, the robotic device to navigate in the environment.

* * * * *